United States Patent [19]

Nakashima et al.

[11] Patent Number: 5,334,339
[45] Date of Patent: Aug. 2, 1994

[54] BORON NITRIDE SINTER AND PROCESS FOR ITS PRODUCTION

[75] Inventor: Masazumi Nakashima, Imari; Hiroshi Nakamura, Nishimatsuura; Sumihiko Kurita, Kishima; all of Japan

[73] Assignee: Kabushiki Kaisha Kouransha, Saga, Japan

[21] Appl. No.: 199,237

[22] PCT Filed: Aug. 7, 1987

[86] PCT No.: PCT/JP87/00592
§ 371 Date: May 19, 1988
§ 102(e) Date: May 19, 1988

[87] PCT Pub. No.: WO88/00934
PCT Pub. Date: Feb. 11, 1988

[30] Foreign Application Priority Data

Aug. 7, 1986 [JP] Japan .................. 61-186459

[51] Int. Cl.⁵ .............................................. C04B 35/58
[52] U.S. Cl. ...................................... 264/65; 423/290; 501/96
[58] Field of Search .............. 264/65; 501/96; 423/290

[56] References Cited

U.S. PATENT DOCUMENTS 4,590,034 5/1986 Hirano et al. ............... 501/96
4,913,887 4/1990 Sato ....................... 423/290

FOREIGN PATENT DOCUMENTS 1210370 2/1966 Fed. Rep. of Germany .
1571615 1/1971 Fed. Rep. of Germany .
62-212204 9/1987 Japan ........................ 501/96

OTHER PUBLICATIONS

Partial Translation of JP 62-59573.
Partial Translation of JP 61-117107.

Primary Examiner—James Derrington
Attorney, Agent, or Firm—Nikaido, Marmelstein, Murray & Oram

[57] ABSTRACT

The present invention relates to a high-strength BN single sinter or a high-strength composite sinter consisting of BN and other ceramics, and a process for its production. The present invention is characterized in that an amorphous BN powder or a powder capable of producing armorphous BN in the course of the sintering step is used as a part or whole of a starting material for a BN component. A boron nitride sinter obtained according to the present invention can be effectively utilized, for instance, as an electronic component part.

4 Claims, No Drawings 5,334,339

BORON NITRIDE SINTER AND PROCESS FOR ITS PRODUCTION

TECHNICAL FIELD

The present invention relates to a boron nitride sinter shaped article consisting of boron nitride alone or of boron nitride and at least one other ceramic component or components. It also relates to a process for the production of such a product.

BACKGROUND TECHNIQUE

A powder of boron nitride (hereinafter called simply BN) has very poor sinterability. Therefore it is a common practice that, as a sintering assistant, a minute amount of at least one oxide such as $B_2O_3$, CaO, etc., is added to the BN powder and the mixture is hot pressed into a BN sinter. According to this production process in the prior art, not only is it difficult to obtain a BN sinter of high purity, but it is also almost impossible to obtain a body of complex shape further, the production cost is expensive.

The present invention has been worked out in view of such problems, and has it as an object to provide a BN sinter, suitably of complex shape having high purity and a high mechanical strength made by a process which includes atmospheric pressure sintering.

DISCLOSURE OF THE INVENTION

The inventors of the present invention zealously researched the above-described problems, and as a result, have reached the following conclusions:

(1) If an amorphous BN powder, or a powder capable of producing amorphous BN in course of the sintering, is added as the BN powder of the starting material, then a sinter having a high mechanical strength can be obtained through atmospheric pressure sintering without making use of a sintering assistant.

(2) The whole of the starting material for a BN component can be replaced by the above-described amorphous BN powder or a powder capable of producing amorphous BN.

(3) The mixed amount of the amorphous BN powder or a powder capable of producing amorphous BN in the starting material for a BN component is preferably chosen to be 5 weight % or more.

While a BN sinter having a density of 1.9 gr/cm³ and a bending strength of 4~7 kgf/mm² was provided as a hot-pressed boron nitride sinter in the prior art, according to the present invention a BN sinter having a density of 1.2~1.9 gr/cm³ and a bending strength of 3~8 kgf/mm² can be obtained. As per the common sense in the prior art, in order to increase a strength of a sinter it was an essentially necessary condition to increase its density. However, according to the present invention, it has become possible to increase a strength of a sinter without always necessitating to increase a density.

The present invention involves the following subject matter:

(1) A process for the production of a boron nitride sinter shaped article, characterized in that at least part of the BN component a starting material is an amorphous BN powder, and after the starting material powder has been shaped it is sintered within a reductive nitriding atmosphere.

(2) A process for the production of a boron nitride sinter shaped article as described in item (1) above, characterized in that the amount of the amorphous BN powder in the above-described BN component serving as a starting material is 5 weight % or more of the amount of the aforementioned BN component powder.

(3) A process for the production of a boron nitride sinter shaped article, characterized in that at least part of a BN component a starting material is a powder capable of producing amorphous BN in the course of the sintering step, and after the starting material powder has been shaped it is sintered within a reductive nitriding atmosphere.

(4) A process for the production of a boron nitride sinter shaped article as described in item (3) above, characterized in that the amount of the "powder capable of producing amorphous BN in the course of the sintering step" in the starting material for the BN component is 5 weight % or more of the amount of the BN component powder.

(5) A boron nitride sinter produced by shaping and sintering at least staring material powder in which a part of the BN powder is an amorphous BN powder.

(6) A boron nitride sinter produced by using a powder capable of producing amorphous BN in the course of the sintering step, or a powder consisting of the aforementioned powder and a BN powder as a starting material powder, and shaping and sintering the starting material powder.

The characteristic feature of the present invention resides in that at least a part of the BN component serving as the product starting material is an amorphous BN powder or the powder capable of producing amorphous BN in the course of the sintering step, and preferably the amount of the aforementioned powder is 5 weight % or more of the starting material for the BN component. The reason is because in the case of less than 5 weight % the product strength is too small to be practically usable.

A representative example of the powder capable of producing amorphous BN in the course of the sintering step is a boron (B) powder. If boron is heated within a nitriding atmosphere at a relatively low temperature amorphous BN of various grades is obtained according to the temperature and if the temperature rises further, it becomes stable crystalline BN. "The amorphous BN can be distinguished from the stable crystalline BN by X-ray diffraction pattern. In general, BN having a half width value of the X-ray diffraction (CuK α line) corresponding to the (002) phase of the hexagonal system BN more than a certain value, for example 0.3° C., is defined as amorphous BN." Therefore, boron would be transformed into amorphous BN at temperature lower than the sintering temperature, and the sintering reaction would proceed substantially in a similar mode to sintering of amorphous BN powder.

It is to be noted that in the case of mixing other ceramics (for instance, silicon nitride, aluminium nitride, silicon carbide, or oxides such as alumina) in addition to BN, the mixed amount of the other ceramics is limited to less than 50 weight %, and thereby the properties of the boron nitride ceramics can be insured.

PREFERRED EMBODIMENT 1

(1) As a starting material powder, the following was prepared:

| | |
|---|---|
| crystalline BN powder | 5 weight parts |

| | |
|---|---|
| -continued | |
| amorphous BN powder | 95 weight parts | e,crc/2/ The above starting material powder was press-shaped into a plate having dimensions of 50×50×10 mm.

(3) The above-described plate was sintered within a reductive nitriding atmosphere ($NH_3 + N_2$ gas atmosphere) at the atmospheric pressure, at a temperature of 1700° C.

(4) The properties of the obtained sinter were a density of 1.6 gr/cm$^3$ and a bending strength of 5 kgf/mm$^2$. In this connection, the material properties of the hot-pressed product provided in the prior art were a density of 1.8 gr/cm$^3$ and a bending strength of 7 kgf/mm$^2$, and even as compared to this product in the prior art, it can be understood that the product according to this preferred embodiment which was sintered at the normal pressure incorporates sufficiently excellent properties.

PREFERRED EMBODIMENT 2

(1) As a starting material powder, the following was prepared:

| | |
|---|---|
| crystalline BN powder | 60 weight parts |
| boron powder | 40 weight parts |

(2) The above starting material was press-shaped into a plate having dimensions of 50×50×10 mm.

(3) The above-described plate was sintered within a reductive nitriding atmosphere ($NH_3 + N_2$ gas atmosphere) at the atmospheric pressure, at a temperature of 1700° C.

(4) The properties of the obtained sinter were a density of 1.7 gr/cm$^3$ and a bending strength of 6 kgf/mm$^2$.

Industrial Availability

As will be obvious from the above description, according to the present invention, (1) a boron nitride sinter shaped article having a high strength can be obtained even by sintering at a atmospheric pressure, and (2) a boron nitride sinter having a complex configuration can be obtained easily. The boron nitride sinter shaped article, made according to the present invention can be used, for instance, as various kinds of electronic component parts.

We claim:

1. A process of producing a sintered shape article comprising boron nitride, which comprises forming a starting powder mixture comprising at least 5% by weight of amorphous boron nitride; shaping said powder into a shape corresponding to the article to be produced; and subjecting said shape to sintering conditions, comprising substantially atmospheric pressure, under a reductive nitriding atmosphere.

2. A process of producing a sintered shaped article comprising boron nitride, which comprises forming a starting powder mixture comprising a material which is capable of producing at least 5% by weight of amorphous boron nitride based on the starting powder mixture under sintering conditions; shaping said powder into a shape corresponding to the article to be produced; and subjecting said shape to sintering conditions, comprising substantially atmospheric pressure, under a reductive nitriding atmosphere.

3. A process as claimed in claim 1 wherein said powder consists essentially of amorphous boron nitride.

4. A process as claimed in claim 2 wherein said powder consists essentially of a material capable of forming amorphous boron nitride under sintering conditions.

* * * * *